United States Patent

Kreitmair-Steck et al.

[11] Patent Number: 5,614,907
[45] Date of Patent: Mar. 25, 1997

[54] ALL WEATHER VISUAL SYSTEM FOR HELICOPTERS

[75] Inventors: Wolfgang Kreitmair-Steck, Höhenkirchen; Helmut Klausing, Wessling/Hochstadt, both of Germany

[73] Assignee: Daimler-Benz Aerospace AG, Germany

[21] Appl. No.: 616,003

[22] Filed: Mar. 14, 1996

[51] Int. Cl.⁶ .......................... G01S 13/90; G01S 7/04
[52] U.S. Cl. .............................. 342/25; 342/55; 342/179
[58] Field of Search .......................... 342/25, 55, 66, 342/179, 197

[56] References Cited

U.S. PATENT DOCUMENTS

| | | | |
|---|---|---|---|
| 4,562,439 | 12/1985 | Peralta et al. | 342/81 |
| 4,626,860 | 12/1986 | Tricoles et al. | 342/442 |
| 4,638,315 | 1/1987 | Raven | 342/25 |
| 4,912,685 | 3/1990 | Gilmour | 367/88 |
| 5,017,922 | 5/1991 | Klausing et al. | 342/25 |
| 5,045,855 | 9/1991 | Moeira | 342/25 |
| 5,093,649 | 3/1992 | Johnson | 342/157 |
| 5,132,686 | 7/1992 | Witte | 342/25 |
| 5,166,688 | 11/1992 | Moreira | 342/25 |
| 5,182,562 | 1/1993 | Witte | 342/25 |
| 5,191,344 | 3/1993 | Moreira | 342/25 |
| 5,241,314 | 8/1993 | Keeler et al. | 342/54 |
| 5,379,041 | 1/1995 | Klausing | 342/25 |
| 5,381,152 | 1/1995 | Klausing | 342/25 |
| 5,392,047 | 2/1995 | Klasuing | 342/25 |
| 5,451,957 | 9/1995 | Klausing | 342/25 |

FOREIGN PATENT DOCUMENTS 4328573  3/1995  Germany.

OTHER PUBLICATIONS

"Dual Usage in Military and COmmercial Technology In Guidance and Control," North Atlantic Treat Organization, AGARD-CP-556, Mar. 1995, pp. 12-1 -12-8.

*Primary Examiner*—John B. Sotomayor
*Attorney, Agent, or Firm*—Evenson, McKeown, Edwards & Lenahan P.L.L.C.

[57] ABSTRACT

The invention relates to an all weather visual system that combines information from a ROSAR type radar sensor with navigation and flight information to provide artificial vision for the pilot. The radar utilizes the movements of rotating arms fixedly mounted on the rotor head of a helicopter. For this purpose, a turnstile is used as the central carrier structure, which is protected by an aerodynamically shaped body against atmospheric forces. The radar transmitter and radar receiver are located on the rotor head and in the tips of the rotating arms, respectively.

7 Claims, 7 Drawing Sheets

ANTENNA APERTURE ANGLE δ ≦ 90°

ANTENNA APERTURE ANGLE δ ≦ 120°

ANTENNA APERTURE ANGLE δ ≦ 72°

PLANE I
PLANE II

ALL WEATHER VISUAL SYSTEM FOR HELICOPTERS

BACKGROUND AND SUMMARY OF THE INVENTION

The invention relates to an all weather visual system for helicopters using a synthetic aperture radar, based on rotating antennas.

U.S. Pat. No. 3,896,466 teaches a system with real-aperture radar whose antennas are centrally mounted; while U.S. Pat. No. 4,924,299 teaches providing SAR systems with a navigation system. These embodiments, however, are not suitable for ROSAR (rotating synthetic aperture radar) designs. German patent document DE 39 22 086 C1, see also U.S. Pat. No. 5,451,957 from Sep. 19, 1995, of applicant teaches a ROSAR device in which at least one antenna for sending and receiving radar pulses is located at the end of a rotating arm, for example, a helicopter rotor or a turnstile above the rotor axis. The received signals are demodulated and stored temporarily, and then correlated with reference functions. A radar of this type can be used for on-line operation in real time, and after special modifications can be employed not only for assisting landings, but also for target interception and tracking. However, the adaptation of this type of system into an all weather visual system is heretofore unknown.

The object of the present invention is to increase the lateral resolution of an all weather visual system with good vertical resolution and to permit optimum flight using a radar image.

To achieve this object, the present invention provides an all weather visual system which combines and displays information from a ROSAR type radar sensor with information from the on-board navigation and flight systems to provide artificial vision for the pilot, with the radar utilizing the rotational movements of rotating arms.

FIG. 3 shows the system design of the all weather visual system for helicopters with different expansion possibilities according to the invention. The central component of the system is a radar sensor 9 with the associated radar processor/image processor/obstacle processor 8. Flight information in the form of symbols generated by the navigation computer/symbol generator is superimposed on the radar image and the obstacle display. This complex image is then sent to a cockpit display 10. The data generated by the precision gyros and acceleration sensors 11 for motion compensation can also be used simultaneously in the navigation computer 12 for position calculation. An optional radar altimeter 13 supplements barometric altitude measurement 15 and increases safety when landing. An autopilot system 14 increases pilot comfort for normal flight.

A system of this kind can also be combined with the navigation computer and obstacle processor in such fashion that when there is direct threat to the helicopter from an obstacle, the autopilot initiates suitable evasive maneuvers. For flight under instrument flight conditions, conventional radio navigation systems 16 are connected to the navigation computer. Additional positional accuracy for normal flight and landing can be achieved by integrating a satellite navigation system 17 (GPA, differential GPS, or relational GPS). Another logical supplement to the all weather visual system is a digital map system 18 with maps of roads and airports.

Other objects, advantages and novel features of the present invention will become apparent from the following detailed description of the invention when considered in conjunction with the accompanying drawings.

DETAILED DESCRIPTION OF THE DRAWINGS

Figure 1:
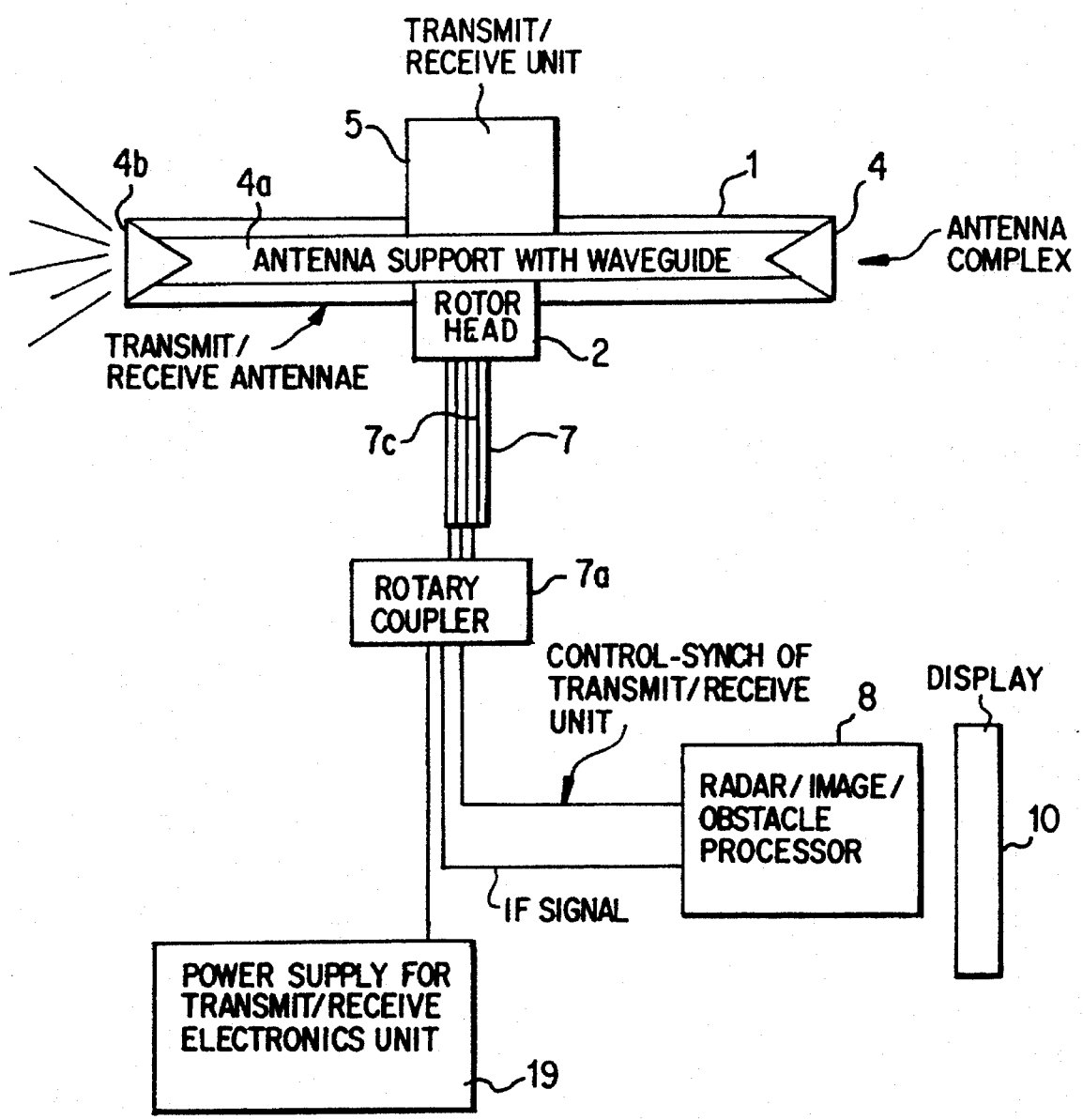
FIG. 1 is a schematic diagram of a first embodiment of an all weather radar system according to the invention.
Figure 2:
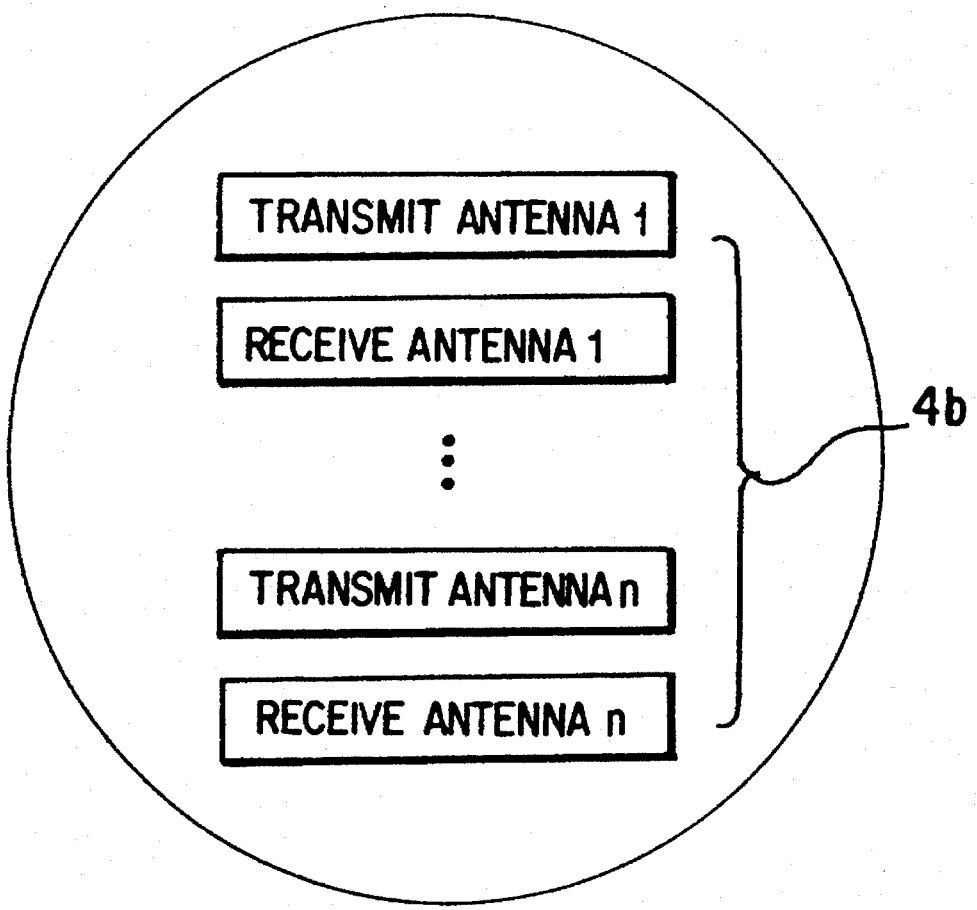
FIG. 2 is a schematic diagram which shows an arrangement of transmit and receive antennae at the tip of an antenna support arm according to the invention.

FIG. 1 is a schematic depiction of an all weather radar system according to the invention. It shows an antenna support arm 4 which houses a waveguide 4a and has mounted at the end thereof one or more transmit and receive radar antennae 4b, as shown schematically in FIG. 2. The antenna support arm 4 is mounted on the rotor head 2 of a helicopter rotor 7. A transmit/receive unit 5 generates a radar signal which is emitted via the wave guide 4a and transmit antennae 4b in a manner known to those skilled in the art. The echo signals are received by receive antennae 4b and converted into intermediate frequency (IF) signals by the transmit/receive unit 5. (The transmit and receive electronics 5 are shown schematically in FIG. 6B.) The IF signals are then transmitted via a rotary coupler 7a to the static (non-rotating) part of the helicopter, where they are processed in the radar/image/obstacle processor unit 8, and the results are displayed by a display unit 10 in the form of a photograph-like image. A power supply unit 19 provides electric power to the system.

Figure 4A:
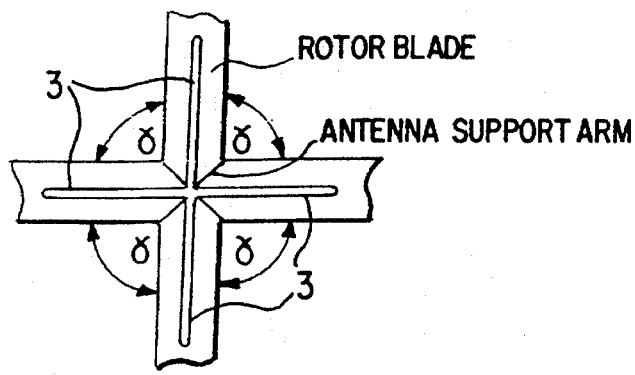
FIGS. 4A–4C are schematic diagrams showing various rotor configurations (three-blade, four-blade and five-blade rotors) and the associated antenna aperture angles for each.
Figure 4B:
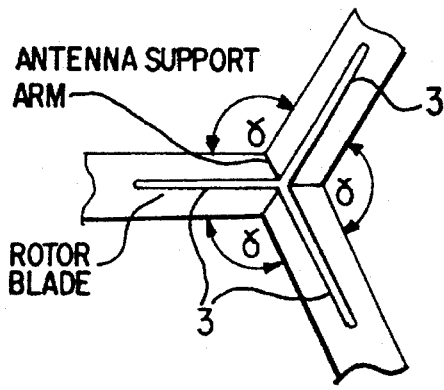
Figure 4C:
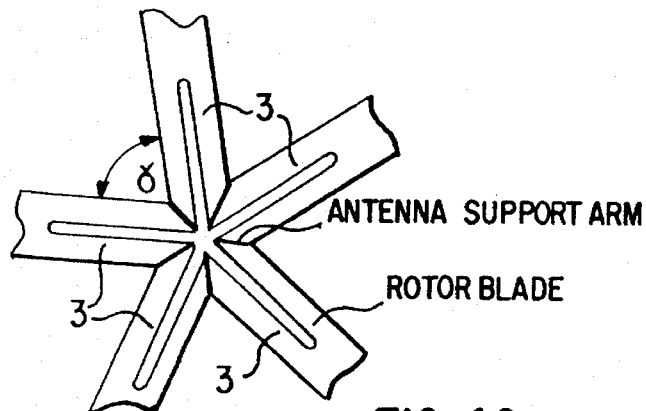

As FIG. 1 and 4A–4C show, the antenna support arms 1 of the radar system according to the invention described below are mounted on the rotor head 2 in such fashion that, depending on the number of rotor blades 3, they are located in the corresponding medians between the rotor blades. FIG. 4A, for example, shows a configuration which includes four rotor blades 3, corresponding to the embodiment of 6A and 6B. As can be seen in both FIGS. 4A and 6B, the antenna support arms 4 are arranged in the angular medians between the four rotor blades 3, and each antenna has an aperture angle γ, which in the four bladed embodiment is approximately 90°. As shown in FIG. 4B, when the number of rotor blades 3 is decreased to 3 the antenna aperture angle is 120°, while with 5 blades (FIG. 4C) it is 72°.

Figure 5A:
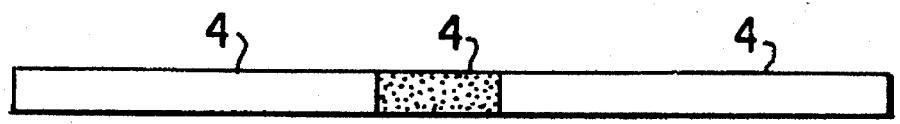
FIGS. 5A and 5B are schematic diagrams showing possible positioning of the arms of the radar system in one and two planes, respectively.
Figure 5B:
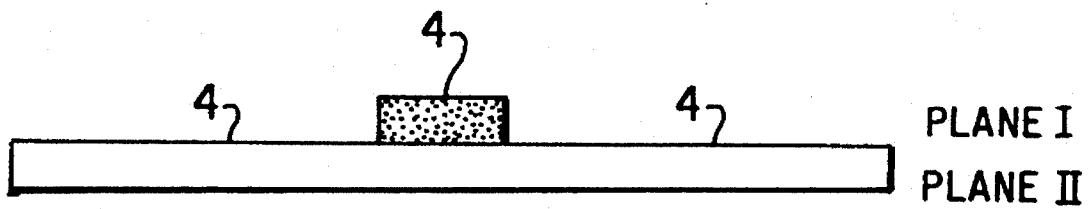

The antenna support arms can be positioned in a single plane, or pairwise in a plurality of planes. FIG. 5A, for example, shows a schematic depiction of an embodiment in which four antenna arms 4 (in the case of four bladed rotor) are arranged in a single plane. (Note that two of the antenna support arms 4, located in the center of the figure, are viewed end on, and project upward and downward perpendicular to the plane of the figure.) FIG. 4B, on the other hand, shows a four support arm embodiment in which a first pair of antenna support arms 4 is shown in a plane I while a second pair (again, viewed end on) projects perpendicular to the plane of the figure, in a plane II.

Figure 6A:
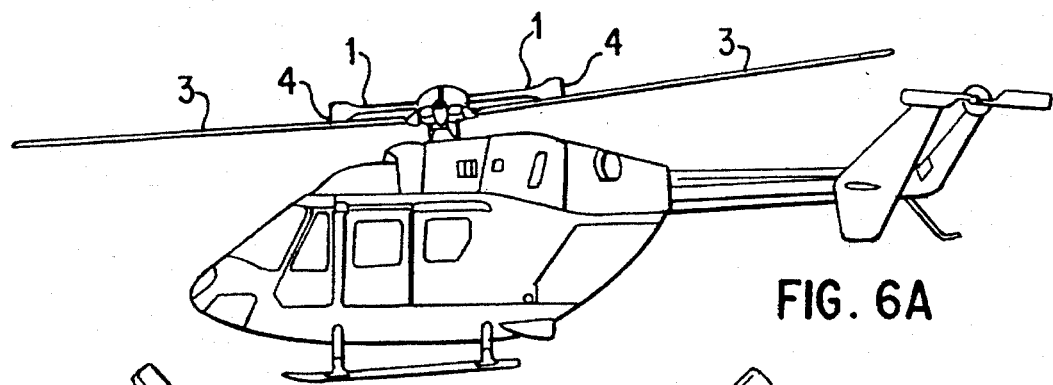
FIGS. 6A and 6B are side and top views respectively of a helicopter equipped with the aerodynamically designed ROSAR system according to the invention.
Figure 6B:
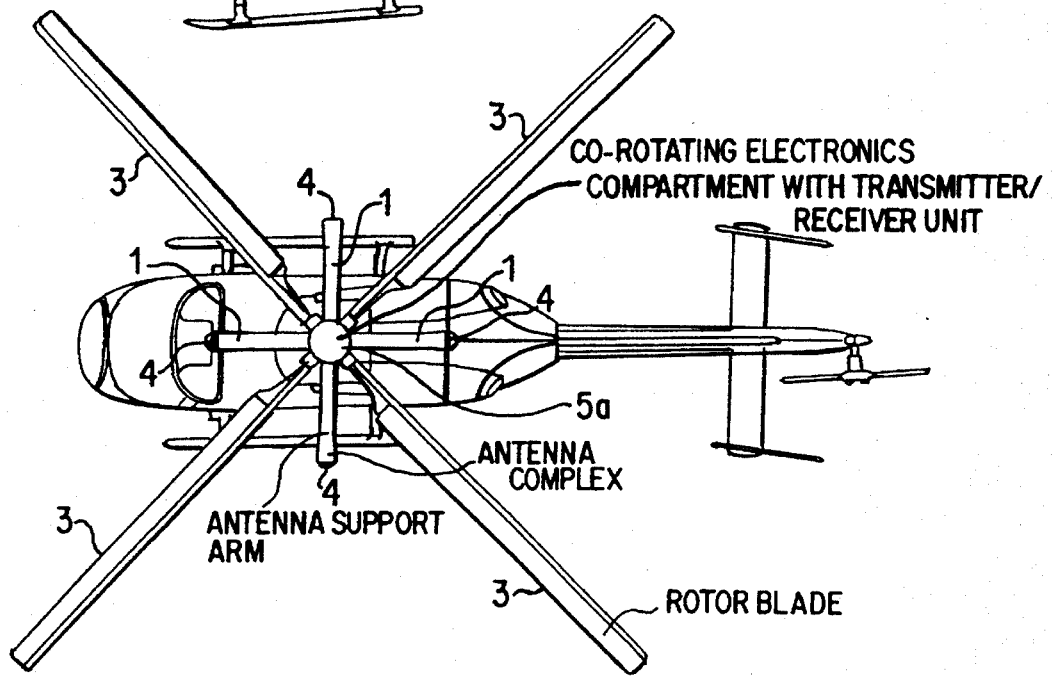
Figure 7A:
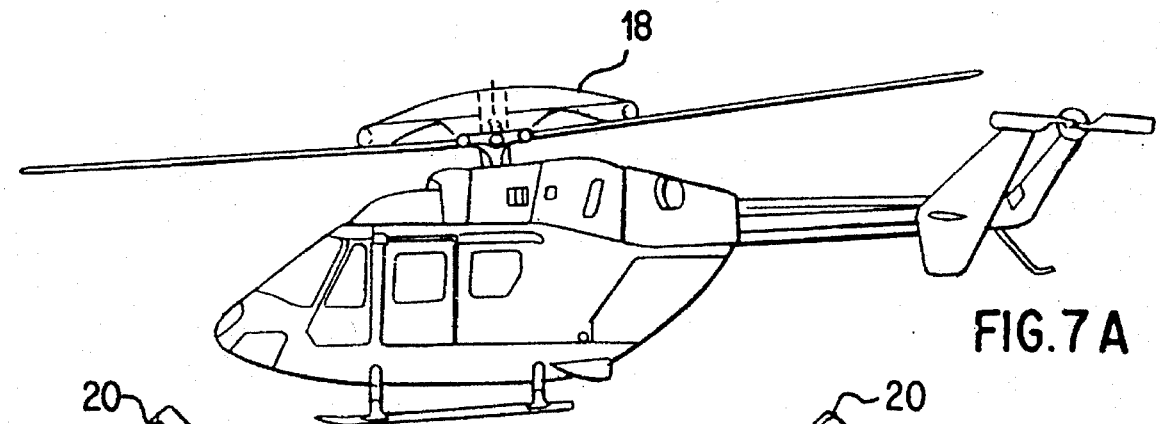
FIGS. 7A and 7B are side and top views respectively of a helicopter equipped with an aerodynamically shrouded ROSAR system according to the invention.
Figure 7B:
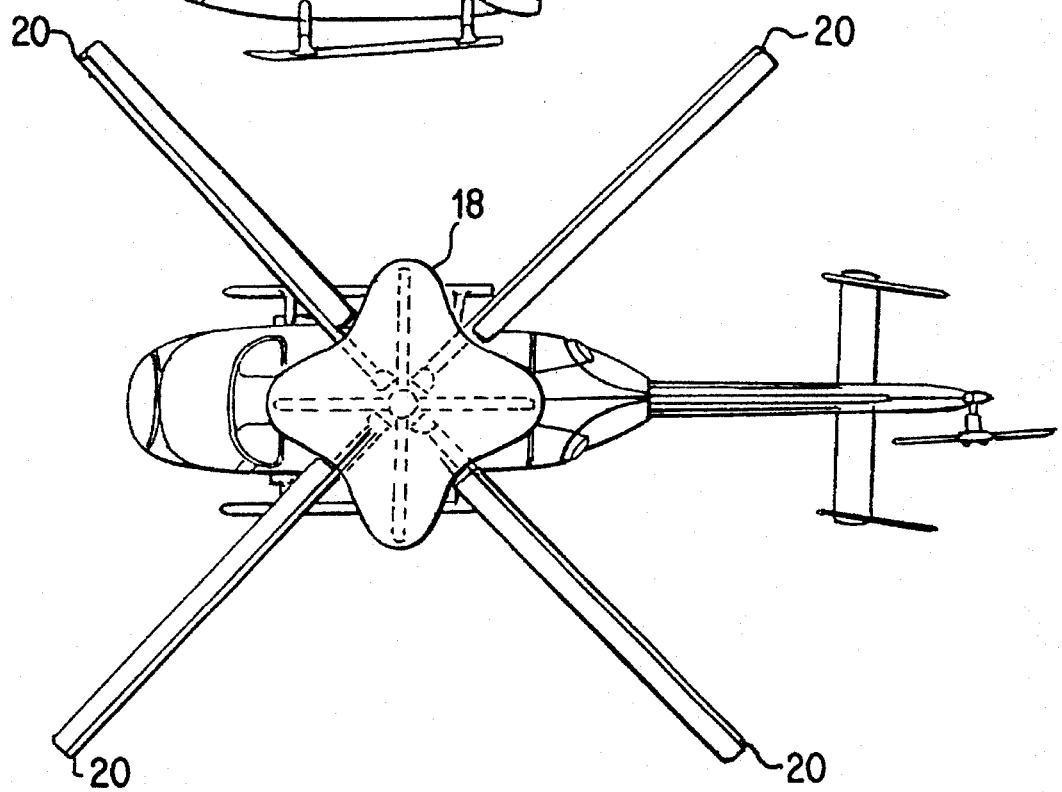

As noted previously, the support arms 4 (for example, a turnstile) themselves have at their ends one or more radially directed radar antennae 4 which are aerodynamically shaped or provided with an aerodynamic shroud 18 (FIGS. 6 and 7). Alternatively, the antennas may be located at the ends 20 of the helicopter rotor, as shown schematically in FIG. 7B.

One or more transmitting and receiving antenna pairs with different elevational directions are integrated into the end of each of the antenna support arms as indicted schematically by broken lines in FIG. 1. As a result, the elevation resolution can be adjusted to the specific needs or applications of the radar system.

The transmitting and receiving electronics of the radar are partially integrated in the rotating antenna support arms and partially in a co-rotating electronic housing 5a which is mounted centrally on the rotor axis of the helicopter. Preferably the voltage stabilized power supply 19 (FIG. 1) is integrated into this central space.

Figure 3:
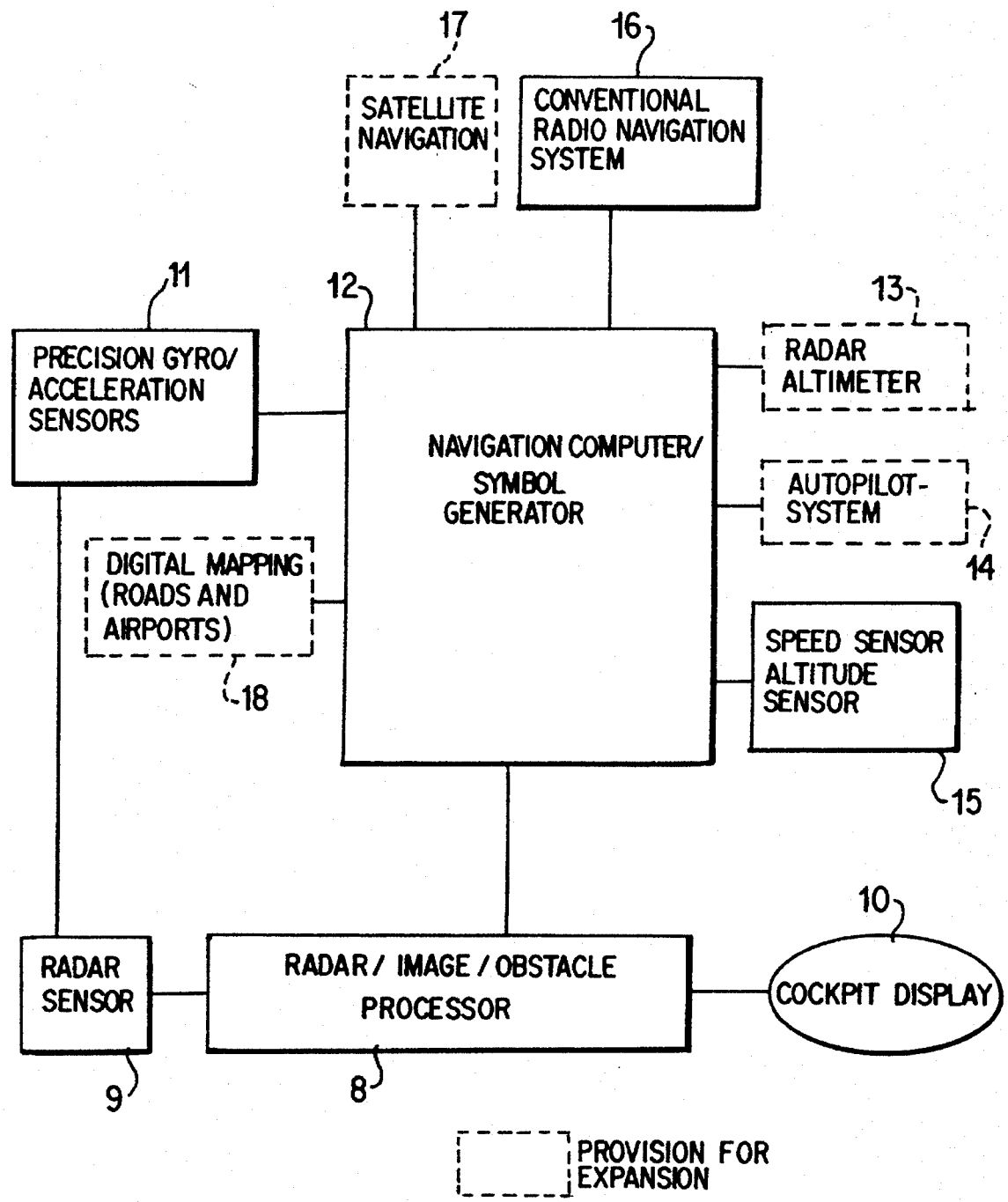
FIG. 3 is a block diagram which shows the structural elements in the embodiment of FIG. 1.

It is also known that ROSAR signal processing does not assume an ideal orbit with a constant angular velocity, since the antenna arm tips undergo variations during each revolution that must not be underestimated. Therefore, in the present all weather visual system as shown in FIG. 3, acceleration sensors 11 are preferably located near the antennae to detect relative deviations from the orbit as a basis for motion compensation.

As noted previously, the receiving electronics 5, preferably located at the center above the rotor head, processes the radar signals received, as intermediate frequency (IF) signals which are transferred through the rotor shaft 7 (FIG. 1), with the aid of a rotational coupler 7a into the nonrotating part of the helicopter, and fed to the digital radar processor 8. This data transfer can be performed optically by optical fibers, or electrically by coaxial cables or hollow waveguides 7c.

The forward speed of the helicopter must also be taken into account. Accordingly, continuous speed measurement is performed by sensor 15 and used for motion compensation. A highly precise inertial navigation unit, an evaluation unit for satellite navigation data, or even better, an autonomous Doppler evaluation of the emitted radar signal is required for this purpose.

The exact position of the rotational plane of the antenna support arms must be known, as a further component for motion compensation. The exact values are either supplied by the normal navigation gyro of the helicopter (not shown) or by special precision gyros 11 located at the center of the rotor head mount.

The radar information thus processed or prepared is sent as photo-like images to a screen 10 in the cockpit of the helicopter for display viewing. The information can also be projected by a projector on the inside of the windshield in the cockpit, or displayed on a display mounted on the helmet. To generate the images, the partial images from the antennas with different elevation angles are linked to one another and smoothed in a conventional manner. Important details for the composition of the total image provide the range information obtained from the radar echo. Naturally the more accurate this range information is, the more precisely the total image can be constructed and the better the resultant all weather visual system will be. It should also be mentioned that it is a simple matter to superimpose other symbols for flight, etc. on the images.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. All weather visual system for a helicopter, of the type comprising a synthetic aperture radar unit with rotating antennas, in which at least one radar antenna is located at the end of a helicopter rotor or a turnstile above a rotor axis, to transmit and receive radar pulses, received signals being demodulated, temporarily stored, correlated in a computer, and then displayed, wherein:

radar antennas are positioned between the rotor blades in one of: a single plane, and planes that overlap one another pairwise;

transmitting and receiving antenna pairs with different elevational directions are integrated in the ends of rotating antenna support arms;

radar transmitting/receiving electronics in the rotating antenna support arms and in a co-rotating electronics housing are integrated with a power supply;

acceleration sensors coupled to provide inputs to said computer for motion compensation;

means for measuring the forward speed are coupled to provide inputs to said computer;

precision gyros are provided to locate the rotational plane of the antenna support arms, said precision gyros also being coupled to provide inputs to said computer; and means coupled to an output of said computer are provided for displaying radar information as a photo-like image on a screen located in the cockpit, partial images from the antennas with different elevation angles being linked and smoothed to create said images.

2. All weather visual system according to claim 1 wherein the radially directed radar antennas are aerodynamically shaped.

3. All weather visual system according to claim 1 wherein antennas are provided with an aerodynamic shroud.

4. All weather visual system according to claim 1 wherein the receiving electronics in the centrally located electronics compartment or in the antenna support arms processes radar signals as intermediate frequency (IF) signals and conducts them through the rotor shaft by means of a rotary coupler to the radar processor.

5. All weather visual system according to claim 2 wherein the receiving electronics in the centrally located electronics compartment or in the antenna support arms processes radar signals as intermediate frequency (IF) signals and conducts them through the rotor shaft by means of a rotary coupler to the radar processor.

6. All weather visual system according to claim 1 wherein analog or analog/digital data transfer is performed by means of one of the following: optical fibers, coaxial electric cables, and hollow waveguides.

7. All weather visual system according to claim 1 wherein forward speed of the helicopter is determined autonomously by Doppler evaluation of the emitted radar signal for motion compensation, and the position of the rotational plane is determined by one of the following: precision gyros located at the center of the rotor head axis, and an on-board navigation gyro.

* * * * *